United States Patent [19]

Hochberg

[11] Patent Number: 4,531,511

[45] Date of Patent: Jul. 30, 1985

[54] MEANS FOR CONTROLLING HEAT FLUX

[76] Inventor: Nelson D. Hochberg, P.O. Box 192, Flagstaff, Ariz. 86002

[21] Appl. No.: 513,702

[22] Filed: Jul. 14, 1983

[51] Int. Cl.³ .............................................. F24J 3/02
[52] U.S. Cl. .................................. 126/450; 126/417; 126/430; 165/135
[58] Field of Search ............... 126/450, 444, 429, 417, 126/430; 165/133, 135, 136

[56] References Cited

U.S. PATENT DOCUMENTS

| | | | |
|---|---|---|---|
| 3,107,052 | 10/1963 | Garrison | 126/428 X |
| 3,227,153 | 1/1966 | Godel et al. | 126/443 |
| 3,995,615 | 12/1976 | Hojnowski | 126/444 |
| 4,038,965 | 8/1977 | Lyon | 126/446 |
| 4,108,373 | 8/1978 | Chiapale et al. | 126/428 X |
| 4,142,509 | 3/1979 | Hermann et al. | 165/135 X |
| 4,184,480 | 1/1980 | Kenny | 126/450 |
| 4,232,731 | 11/1980 | Kaplow et al. | 126/430 X |
| 4,258,701 | 3/1981 | Buckley | 126/450 X |
| 4,273,100 | 6/1981 | Cogliano | 126/430 X |
| 4,281,642 | 8/1981 | Steinberg | 165/136 X |
| 4,286,576 | 9/1981 | McClelland | 126/428 |
| 4,355,629 | 10/1982 | Cornell, III | 126/437 |

OTHER PUBLICATIONS

"Development of a High Performance Air Heater Through Use of an Evacuated Tube Cover Design", Proceedings of 1983 Annual Meeting of American Section of International Solar Energy Society, Inc.
"Air-Bubble Window Glass Saves Energy" Popular Science, p. 136, Nov. 1982.
"Heat-Storing Salto" by Erik H. Arctanler, Popular Science, p. 82, Dec. 1982, Solar Age Specification Guide, Solar Vision, Inc., 1982.

Primary Examiner—Larry Jones
Attorney, Agent, or Firm—Cahill, Sutton & Thomas

[57] ABSTRACT

A form of insulation is disclosed that takes up less room and is more efficient than insulation currently available. It has several modes of use that make it more versatile than conventional insulation. The insulation is formed from a pair of surfaces that are sealed to each other at all edges to form an enclosed chamber, a honeycomb, a cellular matrix, or truss structure is inside the said chamber, separating the surfaces. Said chamber is evacuated and the surfaces that face the chamber are constructed to be of low emittance so as to provide an insulation that significantly inhibits the transference of heat in any manner. By using a material with a high absorbtion and low emittance on one surface and a material with high emittance and low absorbtion on the opposite surface, heat can be transferred easily in one direction but poorly in the other direction, thus acting as a thermal diode. By using a material on one or both surfaces that changes emittance and/or absorbtance at specified temperatures, heat transfers easily within a temperature range and transfers poorly at other temperatures, thus acting as a thermal valve. By filling said chamber with a material that has a high heat storage capacity, the invention can be utilized to store heat for future use. The modes of use that have been mentioned above can be used in combination with a means to transfer liquid and thus construct a solar collector that is more efficient in reducing the loss of heat from radiation, conduction and convection.

4 Claims, 7 Drawing Figures

MEANS FOR CONTROLLING HEAT FLUX

This invention relates to a method of controlling heat flux for the purposes of conserving energy.

BACKGROUND FOR THE INVENTION

The present invention is versatile. It has four significant modes of use, that of an insulating wall or window, a thermal diode or valve, a heat storage panel and when the above modes of use are combined, a passive solar collector. In order to adequately present the background of the invention in a clear manner, each mode of use is discussed separately.

The efficiency of an insulator is affected by the amount of heat loss by conduction, convection, or radiation. It has been found that heat loss due to conduction and convection can be significantly reduced to near zero by evacuating the air within an enclosed space. Heat loss due to radiation can be inhibited by the use of surfaces that are of low emittance. Until now, the problem of evacuating an air space for the purposes of insulating has been difficult due to atmospheric pressure that is exerted upon the exterior surfaces. With at atmospheric pressure of about 14.7 lbs./sq. inch, an evacuated container will have an atmospheric pressure of approximately one ton per square foot. Not all materials are strong enough to withstand the atmospheric pressure on their own. In most cases there is a need to support the exterior of a structure that contains a vacuum. Additionally, different materials will expand and contract at different rates as the temperature rises and falls. If a container is constructed of two or more different types of material that are sealed together, and the materials expand and contract at different rates, then there is a great possibility that the seal will rupture causing a break in the vacuum. Not all materials are suitable to maintain a vacuum. For example, plastics are organic substances and are therefore permeable to gases. Eventually, any plastic or partially plastic container will lose the vacuum.

Currently, walls of houses $3\frac{1}{2}$ inches thick that are constructed using standard insulation material have an R value of 11. A building constructed of the present invention with walls 3 inches thick would have an insulation value as high as R 466, an improvement of 4,200%. Further, the 3 inch wall of the present invention could be designed structurally sufficient in itself to support the building, requiring no other support structure. Ordinary windows have an insulation value of approximately R 0.81 and double-pane windows have an insulation value of approximately R 1.4. A window constructed of the present invention would have an insulation value of over R 11, a 780% improvement.

On a smaller scale, the present invention can be constructed as a cabinet for use as a refrigerator or an oven. A conventional domestic refrigerator has approximately 1 inch of fiberglass insulation and has an R value of 4. A domestic refrigerator of the present invention would have walls approximately $\frac{1}{4}$ inch thick and have an R value of 48, an improvement of 1,200% in insulation value and an improvement of 1,500% in space utilization. An appliance constructed of the present invention would require less energy to maintain a specified temperature. As a result, homes and industries would spend less money in energy costs for heating or cooling and would require smaller heating or cooling units.

DISCUSSION OF RELATED ART

There are currently several devices that utilize a vacuum to insulate from heat loss and at the same time admit light and radiant heat. Most of these devices employ the use of a vacuum as part of solar collectors. They will be discussed later. There are two devices, to the present inventor's knowledge, that utilize a vacuum with their only purpose being to admit light and act as insulators. U.S. Pat. No. 4,184,480 utilizes two complimentary contoured sheets of glass which are sealed together. The space in between the glass is evacuated. The contours are both lateral and longitudinal so that the glass takes on a sinusoidal corrugation. Although the evacuated space provides insulation from heat loss due to convection and conduction, it does not prevent the loss of heat from radiation. The contoured glass is difficult to construct and therefore expensive to produce. It does not have structural properties which can be used to enhance the strength of a framework.

The present invention is easier to construct and less expensive to produce; therefore, it sets forth an improvement in utilizing an evacuated space. The present invention can be constructed of a variety of materials such as glass, ceramic, steel, aluminum, and other metals. Such flexibility in the materials gives it a wider range of uses and, with the exception of glass, gives it significant structural properties. It also reduces the transference of heat due to radiation, and when constructed of glass, is almost 8 times more effective than double-paned glass. Thus the present invention can maintain an enclosed space under refrigeration or very high temperatures for a significantly long period of time using less energy.

Another device using an enclosed evacuated glass structure was developed by Solaron Corporation, Englewood, Colo. and is described in the Proceedings of the 1980 Annual Meeting, American Section of the International Solor Energy Society, Inc., Volume 3.1. This concept utilizes a multiplicity of evacuated florescent light tubes laid parallel in a plane to form a transparent collector glazing. The tubes are covered with a flat pane of tempered glass as an outer glazing. There is a significant amount of heat loss where the edges of the tubes meet. At these points, the collector box is not protected from heat loss by a vacuum and heat loss by conduction occurs at these points. Additionally, the tubes are not sealed to one another so air can pass between the tubes causing heat loss due to convection. The cylindrical shape of the tubes makes them difficult to seal into place. Because of the curved shape of the ends of the tubes, it is extremely difficult to make an air tight seal that will withstand expansions and contraction that occurs with temperature change. An additional result of the curvature of the tubes is that the sun's rays never strike the collector plate normally. This reduces the efficiency of the collector.

The present invention sets forth an improvement because each surface of the invention is made of a continuous piece of material, eliminating areas of conductive and convective heat loss. Further, the edges of the invention are of a uniform shape and can easily be sealed to the collector box and light can be normal to the entire glass surface.

An article published by Popular Science (November 1982) described some recent research done at Massachusetts Institute of Technology by William J. Schmitt for making glass less thermally conductive. The research involves the use of aerogel, a silicon dioxide that is treated to create a multitude of matrices which contain gas. The result is a glass pane that has insulating properties that are superior to double-pane glass. However, this type of insulation does not employ the use of an evacuated space.

When one surface of the present invention is of high absorbtance and low emittance and the interior facing surface of the opposite side of the invention is of low absorbtance and high emittance, the present invention becomes a thermal diode. That is, it allows heat to transfer easily in one direction but not in the other. To the present inventor's knowledge, no such device has been heretofore invented. Several manufacturers presently market fluid check valves (fluid diodes) and call them thermal diodes; such as, the PR-1 Solarsyphon Diode manufactured by Sun of Man Solar Systems, Guerneville, Calif. This thermal diode is used to prevent the backsyphoning of stored heated water in passive thermosyphon systems. It is a mechanical device which is activated by solar energy. Because it is mechanical, it is subject to wear and tear that will eventually cause it to malfunction. However, the present invention is the only known device, to the present inventor's knowledge, that blocks the flow of radiant heat in one direction and utilizes no moving mass. Since nothing is moving it is more reliable. Further, its flexibility in shape allows it to have a wider range of uses. It can be used to remove heat form an enclosed space and transfer heat into the ambient atmosphere; or, it can be used to transfer heat into an enclosed space from the ambient atmosphere. Either of the above stated uses can substantially cut down the cost of heating or cooling for domestic use or industry. A further use for the thermal diode is as a collector plate in a solar collector. The diode can transfer heat to a liquid, such as water or a eutectic salt hydrate, during hours when the sun is present. It reduces the loss of the stored heat during hours when the sun is not present.

When one or both surfaces of the invention are coated with a substance that changes emittance and/or absorbtance at specified temperatures, the present invention becomes a thermal valve. To the present inventor's knowledge, no such device has been heretofore invented. Temperature controlled mechanical valves and pumps are presently used to alter the flow of chilled or heated fluid, but an insulation that changes its conductivity at specified temperatures is unknown. The present invention as a thermal valve can be used in refrigerators that have an adjoining freezer compartment. Using this thermal valve, a refrigerator would need to have only one cooling unit to cool both the refrigerator and the freezer. The cooling unit would maintain the freezer at the appropriate temperature. As the refrigerator warms, the surface of the invention changes emittance to allow the passage of heat from the refrigerator to the freezer. The heat is subsequently removed by the cooling unit. Once the refrigerator cools to a specified temperature, the surface changes again to inhibit the passage of heat, thus maintaining the refrigerator at a consistent temperature.

When the enclosed chamber of the invention is filled with a heat storing substance, such as a eutectic salt hydrate or water, the invention can store heat for extended periods of time. There are several heat storage products currently on the market. One such product is the Boardman Tube manufactured by Boardman Energy Systems, Inc., Wilmington, Del. The Boardman Tube is a tube shaped container that is filled with eutectic salt hydrate. This phase change material stores heat for use in solar collectors and off peak air conditioning systems. The product comes only in a tube shaped container with the tubes being 4¾ inches in diameter. The present invention sets forth an improvement in a heat storage unit. When a eutectic salt hydrate is used for the heat storage material the interior supporting structure of the present invention encapsulates the material to reduce stratification. Thus the life expectancy of the heat storage is prolonged. Additionally, the honeycomb or cellular structure can be made from a material that is highly conductive, such as aluminum. This will conduct heat evenly throughout the heat storage substance, which often has low heat conductivity, allowing it to absorb and store heat more efficiently.

Another heat storage product is one that was developed by the University of Delaware, Institute of Energy Conservation. The product is a eutectic salt hydrate that is mixed with clay. This is them packaged in a special package that was developed by Du Pont Co. The packaging consists of a thin flexible plastic that is laminated with thin layers of metal. The product is used to absorb and store heat in architectural structures to cut down the cost of heating during winter months. The present invention sets forth an improvement in heat storage because it has a wider range of uses. It can be used to absorb and store heat in an architectural structure and it can also be used to store heat in a solar collector. The present invention can be set in any position without affecting the heat storage capability. Moreover, heat is evenly distributed throughout the heat storage material by the interior supporting structure making it more efficient. A further advantage of the interior supporting structure is that the phase change materials are encapsulated, thus prolonging the life of the phase change materials. The present invention can accommodate a series of pipes to conduct water. The phase change material or the heat storage material surrounds the pipes allowing for a more efficient transfer of heat to the water flowing through the pipes. Further, the present invention has structural properties which can be used to enhance the stability of whatever type of structure that requires a heat storage unit.

Several modes of use of the present invention can be combined to construct a solar collector. The resulting solar collector is a more efficient means of collecting and retaining the heat generated by the sun's energy and is a superior means to prevent the loss of heat during hours when the sun is not present.

There have been several attempts to evacuate a space for the purposes of insulation in several types of flat solar collectors. In U.S. Pat. No. 3,995,615, an evacuated solor collector, the collector window is supported by a plurality of support posts. The posts in and of themselves, are conductors and allow heat to transfer to the collector window and into the ambient atmosphere. When this device is made with ordinary window pane glass, the force of the atmospheric pressure on the glass causes it to bow towards the evacuated interior. This causes the glass to form a "tent" shape. At the "tent" the normal surface irregularities of the glass will open. Contaminants entering the opening will weaken the glass. Eventually the glass will develop leaks and may crack. In order to avoid this problem, a special flame hardened glass with fewer surface irregularities is available. However, this glass, made in Germany, is very expensive and there is no domestic source. Another problem associated with this particular flat solar collector is that the collector window is sealed to the collector box with an adhesive. Since adhesives are organic compounds, the sealed edges are permeable to gases. Also, the collector box is composed of plastic which is gas permeable. Since the collector box is composed of a different material than the glazing of the collector window, it contracts and expands at a different rate than the window, thus applying stress to the seal that will eventually lead to leakage. This necessitates the incorporation of an additional device, which is part of the device to maintain the vacuum within the solar collector.

The present invention does not require adhesives. It is hermetically sealed and can maintain a vacuum for an indefinite period of time. All hermetically sealed components of the present invention are composed of the same material and therefore expand and contract at the same rate. This minimizes the stress to the sealed edges, thus ensuring that the vacuum is maintained for an indefinite length of time. Additionally, when glass is used for the surfaces, the interior supporting structure provides sufficient support to reduce the stress to the surface of the glass. Thus, it is less likely to develop leaks or crack.

U.S. Pat. No. 4,038,965, is another attempt to provide a flat evacuated solar collector. It utilizes longitudinally extending partition walls to support the collector window. Different materials are suggested for the solar window and the collector box. Among the suggested materials are; glass for the collector window and aluminum for the collector box. Both are impermeable to gases and can be fused together; however, it is difficult to maintain a hermetic seal therebetween. The collector box and the collector window are constructed of different materials and therefore expand and contract at different rates. The window and the box are sealed by means of a gasket from which there is a significant amount of gas leakage. Neither U.S. Pat. No. 3,995,615 or U.S. Pat. No. 4,038,965 have provided a means to inhibit heat loss resulting from radiation.

There is another solar collector that utilizes an evacuated space to insulate from heat loss. U.S. Pat. No. 3,277,153 is a tubular solar collector wherein the tubular shape of the collector window has a sufficient resistance to compression from atmospheric pressure. One end of the tube is sealed and the other end is fused to a metal cap through which pipes are inserted to allow the inflow and outflow of liquid. The glass tube and the metal cap are small enough that the seal is not broken by the different rates of expansion and contraction of the glass and the metal. The tube is evacuated and there is no need to utilize a device to renew the vacuum. The tubular solar collector, as a single unit is relatively small in order to obtain the maximum efficiency of the material usage. This allows very little area for the collection of solar energy. In order to employ this method of solar collection, even for domestic purposes, it is necessary to employ a multiplicity of solar collector tubes, thus making the system expensive. Furthermore, the evacuated tube does not inhibit heat loss resulting from radiation, and does not have any heat storage capacity.

U.S. Pat. No. 4,355,629 is an example of the type of passive solar collectors that are currently on the market. This particular passive solar collector utilizes a coffin shaped box, lined with a reflective foil and glazed with double-paned glass. Inside the coffin shaped collector box is a tank that is painted black so as to act as storage for heated water and as a collector plate. The tank is sealed in the collector box, but neither the box nor the glazing is evacuated. This device has a significant change in temperature with the availability of sun light. The temperature of the water can drop 15° to 25° Fahrenheit at night, as the collector box and the glazing do not significantly inhibit heat loss from conduction and convection. The present invention is different from this passive solar collector in that it utilizes an evacuated glazing and an evacuated collector box that significantly reduces the heat loss from conduction and convection, and treated to significantly reduce heat loss from radiation. As a result, the present invention has a negligible loss of heat during hours when the sun is not present.

Further, the present invention can incoporate a transmittance control means. The transmittance control means varies the amount of solar radiant energy transmitted through the cover in accordance with variation of the temperature within the cavity to prevent the collector from overheating. To the present inventor's knowledge, no other solar collector, window, or other radiant transmitting surface uses such a device to control the transmittance of radiant energy which in turn can control temperature.

SUMMARY OF THE INVENTION

This invention relates to a method of controlling heat flux for the purposes of conserving energy. The passage of heat is controlled by a passive device that utilizes two parallel surfaces, sealed to each other on their peripheral edges to form a chamber. Disposed within the chamber is a supporting means to prevent the surfaces from collapsing into the chamber. The chamber can be either evacuated, to prevent the passage of heat by conduction or convection; or, it can be filled with a heat storage material to absorb and store heat. When the chamber is evacuated, selected surfaces of the invention can be constructed so as to increase absorbtance and reduce emittance or increase emittance and reduce absorbtance. Thus, heat can pass easily in one direction but poorly in another for allowing the device to function as a thermal diode. A radiant barrier or a series of radiant barriers can be inserted into the chamber and separated by a series of internal support structures so as to further reduce the passage of radiant heat. Further, selected surfaces of the invention can be constructed so that the surface changes absorbtance and emittance at a specified temperature to inhibit the flow of heat. The surfaces can change absorbtance and emittance again when another specified temperature is reached, thus allowing the device to act as a thermal valve. Several modes of the invention can be combined to construct a solar heat collector, the collector box and glazing being constructed of evacuated units and the thermal collector plate being constructed of either a heat storage unit or being thermally coupled to a heat storage unit. Several variations of the solar collector can incorporate the thermal diode and the thermal valve.

It is an object of the present invention to provide a new energy efficient form of insulation with a wide variety of uses. The invention can be used in a modular fashion and can be made out of a variety of materials. Thus, the invention can be utilized as an insulating wall for architectural structures, refrigerators, ovens, incubators, and any other type of enclosed area where it is important to maintain a controlled temperature range. Further, if a module is constructed so as to permit the transmittance of light, the invention can be used as an insulating window, a view port for an oven, or glazing for a solar collector.

A further object of the invention is to provide an efficient means to absorb and store heat. As a heat storage means, the internal supporting structure serves to distribute heat evenly into the heat storage substance. It also encapsulates the substance thus retarding any potential stratification of the heat storage substance.

A further object of the invention is to provide a totally passive mechanism to control the flow of heat. When embodied as a thermal diode or as a thermal valve, the invention has no moving parts and is therefore not subject to mechanical wear and tear.

A further object of the invention is to provide a totally passive mechanism for collecting solar radiant energy. This mode of use also has no moving parts and therefore is not subject to mechanical wear and tear.

DESCRIPTION OF THE PREFERRED EMBODIMENT

The present invention is versatile and has several modes of use; that of an insulating wall or window, that of a thermal diode, that of a heat storage means and that of a solar radiant energy collector. Each mode of use will be described separately in order to provide a clear presentation of the invention.

Vacuum Wall/Vacuum Window

Figure 1:
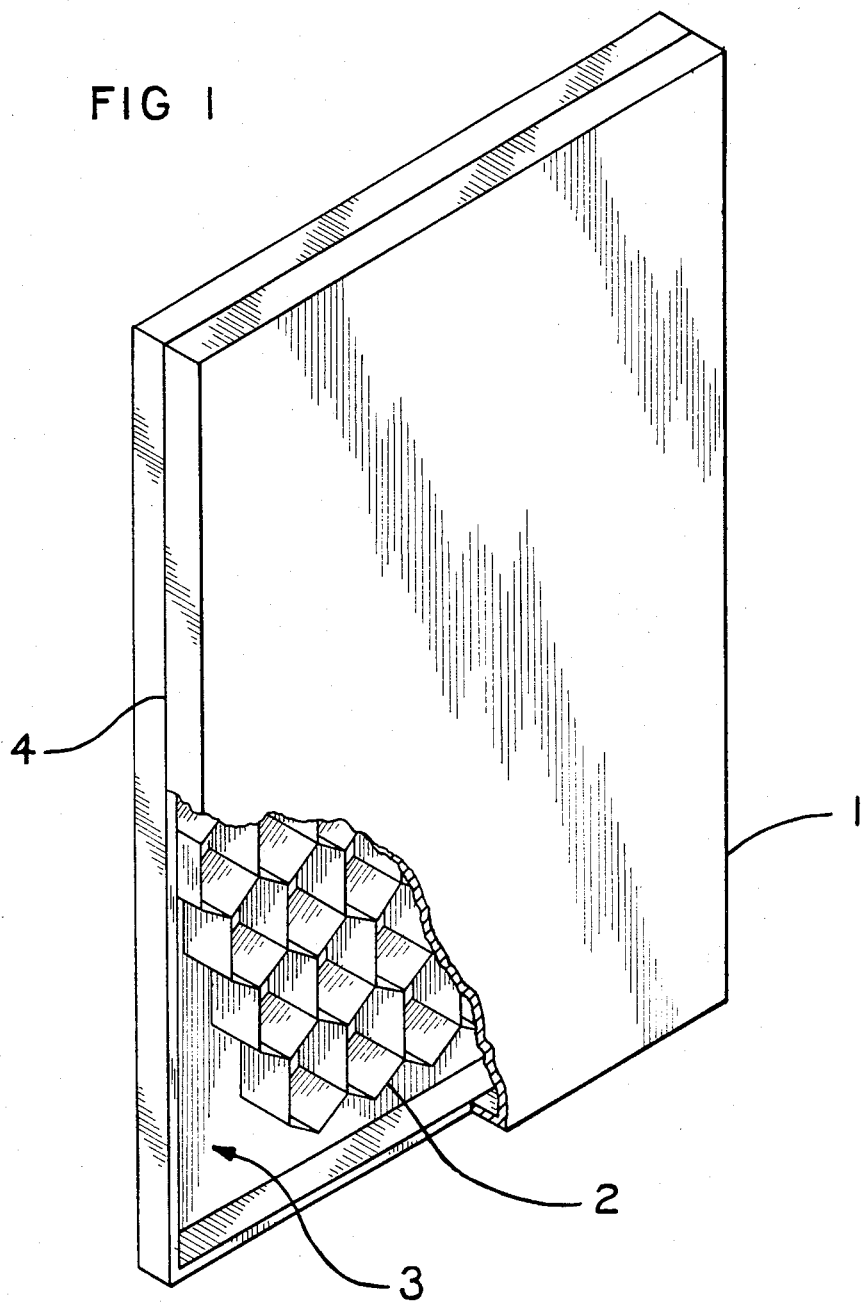
FIG. 1 shows a partially exposed view of the invention whereby the mode of use is that of an insulating wall, window, thermal diode, or heat storage means.
Figure 2:
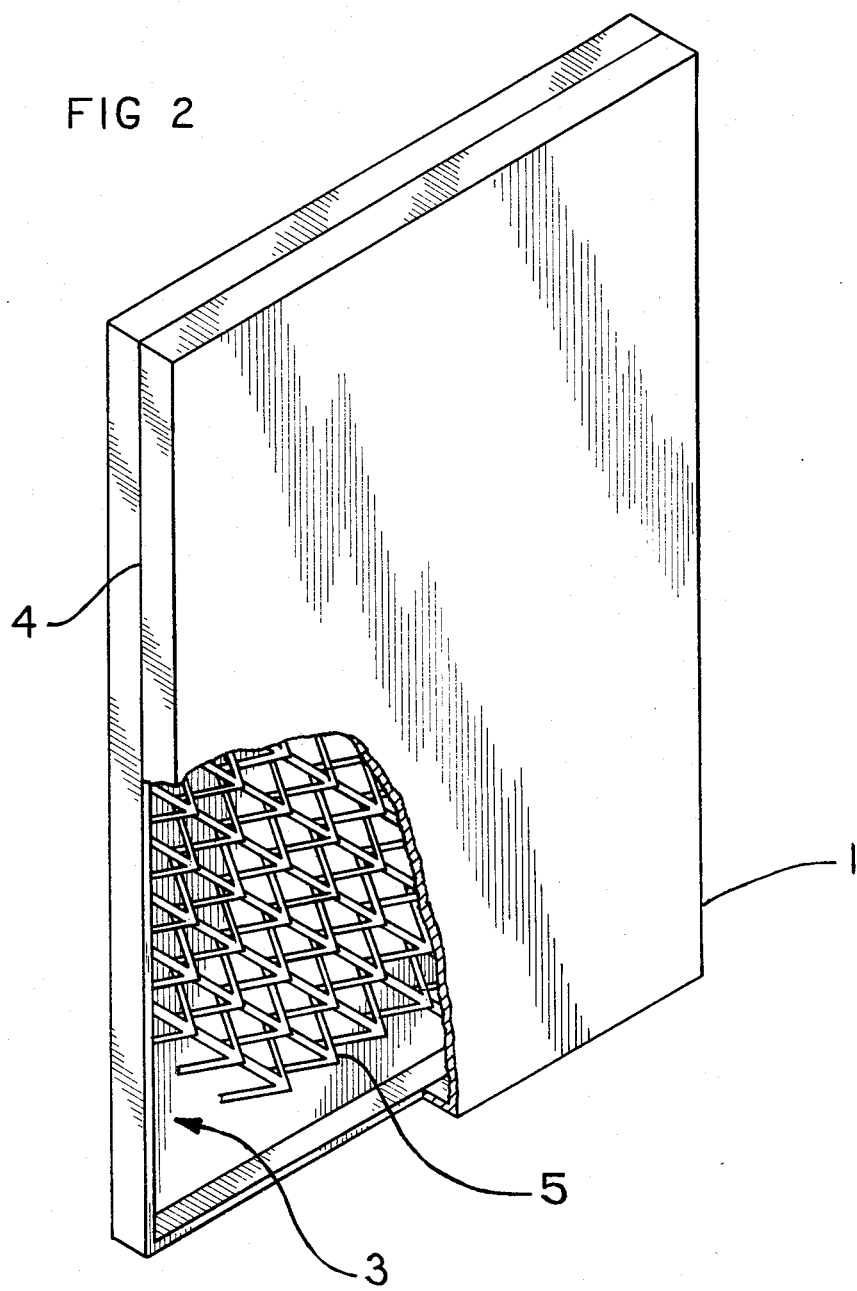
FIG. 2 shows a partially exposed view whereby the internal support is a truss system.

Referring now to the drawings, FIGS. 1 and 2, the invention is composed of two surfaces 1, parallel to each other and spaced apart from one another, made of an impermeable material that are hermetically sealed 4 to each other on their peripheral edges to form a chamber. The surfaces can be made of any impermeable material, a transparent material such as glass, or if the invention is to be exposed to extremely high heat, the surfaces can be made of ceramic. Other suitable materials include steel, aluminum, or other similar metals. Separating the two surfaces is a supporting means disposed within the chamber consisting of a honeycomb or cellular matrix 2 or a truss network as in FIG. 2-5. The supporting means can be made of any material that would be sufficiently strong to keep the surfaces from collapsing into the chamber and is not highly conductive, such as paper, plastic, or ceramic. The supporting means and the surfaces of the invention can be of sufficient strength and mechanically coupled to one another to permit the panel to function as a load bearing structure. The chamber is evacuated to a vacuum sufficient to impair the transference of heat by conduction or convection. For the purposes of the present invention, the vacuum should be approximately below 300 millitore. Less of a vacuum is possible; however, when more air is allowed to remain in the evacuated chamber, the efficiency of the insulating quality is reduced.

The surfaces 3 can be provided with a means to reduce emittance and absorbtance. To accomplish this the surfaces can be polished. If the surfaces are not polished, there are other ways to reduce the emittance and absorbtance. A thin layer of a substance that has low emittance can be applied to the surfaces such as an aluminized film or chrome plating. Such substances are available domestically. For windows, coatings are available such as Low E Glass, developed by Airco Temescal, Berkeley, Calif. Low E Glass reduces the emittance of the glass but permits transmission of visible light. Also, Southwall Corporation, Palo Alto, Calif., manufactures a film known as Heat Mirror which is placed in the space between two pieces of insulating glass. When the surfaces 1 of the invention are constructed using a light transmitting material, the invention functions as a window, glazing for a solar collector, or a view port for an oven, admitting light, while the coating of low emittance 3 on the transparent or translucent material inhibits the transference of radiant heat.

For purposes of mathematical modeling the Vacuum Wall/Vacuum Window can be viewed as two gray body infinite planes parallel to each other radiationally exchanging heat across a vacuum and conductively exchanging heat through the supporting means. Therefore the resistance to heat flux per unit area is:

$$\frac{1}{R} = \frac{1}{1/E_1 + 1/E_2 - 1} + a/tR_c$$

where:
R is thermal resistance,
$E_1$, $E_2$ is the emittance, surfaces 1 and 2 respectively,
a is the ratio of supporting means area per unit area,
t is the thickness of the supporting means,
$R_c$ is the thermal resistance per unit thickness of the supporting means.

Using this formula the R value for different configurations of the Vacuum Wall/Vacuum Window are displayed in the following table:

| Surface Materials | $E^1$ | Supporting Means Material | $R_c$ | a | t in. | $R^2$ | Maximum Operating Temp. °F. |
|---|---|---|---|---|---|---|---|
| Polished Aluminum | .03 | Paper or Plastic | 1.11 | .0031[4] | 1.0<br>.25 | 57<br>39 | 700 |
| Cadmium Plated Steel | .02 | Paper or Plastic | 1.11 | .0031[4] | 1.0<br>.25 | 79<br>48 | 700 |

-continued

| Surface Materials | E[1] | Supporting Means Material | $R_c$ | a | t in. | $R^2$ | Maximum Operating Temp. °F. |
|---|---|---|---|---|---|---|---|
| Polished Stainless Steel (Hot Side) | .09 | Ceramic | .64 | .06[5] | 1.0 | 10.3 | 1700 |
| Cadmium Plated Steel (Cool Side) | .02 | | | | 3.0 | 22.2 | |
| Ceramic (Hot Side) | .92 | Ceramic | .64 | .06[5] | 1.0 | 10.4[3] | 3200 |
| Aluminum Plated Ceramic (Cool Side) | .03 | | | | 3.0 | 18.7[3] | |
| Glass | .84 | Paper or Plastic | 1.11 | .012[6] | 1.0 | 3.7[3] | 200 |
| | | | | | .25 | 3.6[3] | |
| Glass | .84 | Paper or Plastic | 1.11 | .012[6] | 1.0 | 10.1[3] | 200 |
| Low E Glass | .12 | | | | .25 | 8.6[3] | |
| Low E Glass | .12 | Paper or Plastic | 1.11 | .012[6] | 1.0 | 15.7[3] | 200 |
| | | | | | .25 | 11.5[3] | |
| | | | | | .25 | 11.5[3] | |

[1]The emittance value for nominal operating temperature of the Vacuum Wall/Vacuum Window is used.
[2]R Value includes still air film resistance on both sides.
[3]R Value includes surface material insulation value.
[4]1½ inch cell size × 0.007 gage honeycomb.
[5]1 inch cell size × 0.25 gage honeycomb.
[6]¾ inch cell size × 0.007 gage honeycomb.

Figure 3:
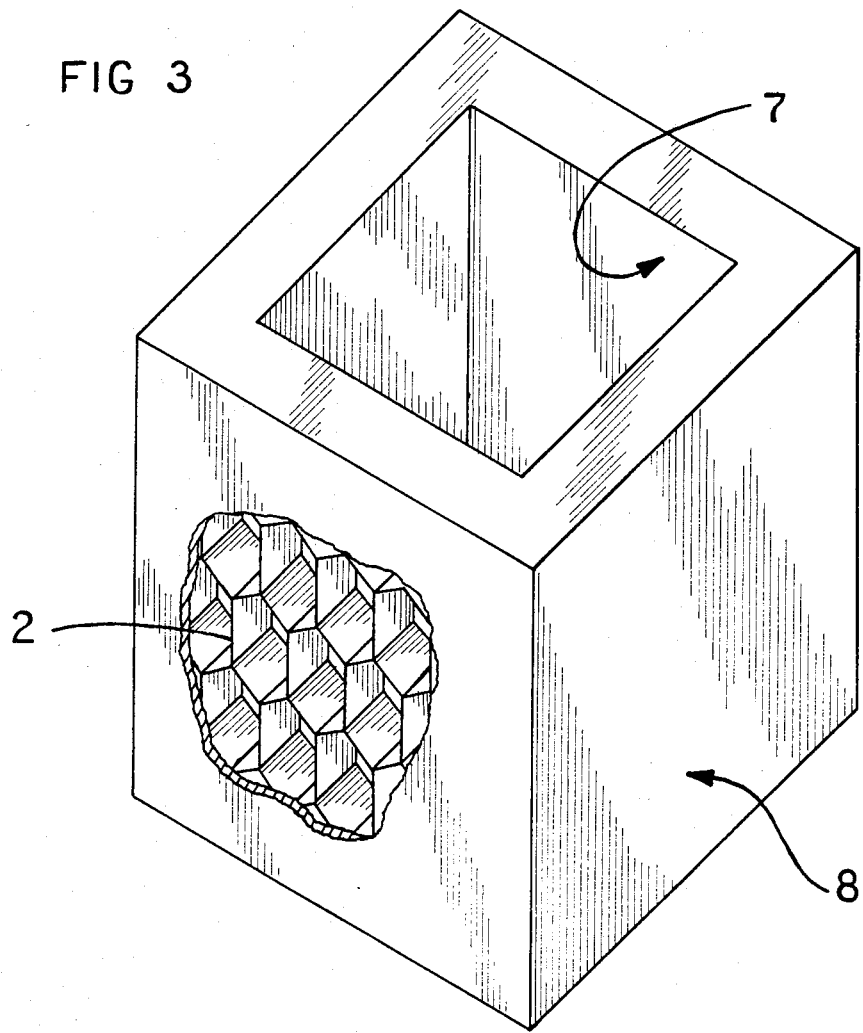
FIG. 3 shows a variation of the invention whereby the surfaces of the invention are constructed as two boxes, one being larger than the other to create an insulating cabinet.

In FIG. 3 each surface of the invention is in the shape of a box, with one box 8 being slightly larger than the other, and the smaller box 7 is inside the larger box. The shapes of the boxes are not restricted to a rectangular shape. The sides of the two boxes are separated by a multiplicity of supporting means 2 or 5, one for each side of the cabinet and one for the bottom. The purpose of the boxes and the supporting means is to form a cabinet surrounding a cavity. A panel is made from the invention that covers the open end of the box, resulting in an insulating cabinet that can be used for an oven, a refrigerator, an incubator, an ice chest or any other type of cabinet that requires the maintenance of a specific temperature range. Such units would require smaller heating or cooling units in order to maintain the required temperature and would use less energy. Considering the invention to be shaped as a panel as in FIG. 1, and each panel is a modular unit for the purposes of erecting a large enclosed room, the invention can be utilized for a walk-in cooler. This too would require a smaller cooling unit and the unit would not require as much energy to maintain a cool temperature as an ordinary walk-in cooler. A number of panels can be attached together to form walls, ceiling, and floors of a building. The result would be an architectural structure that can be easily heated or cooled and can maintain a constant temperature for an extended length of time.

Figure 7:
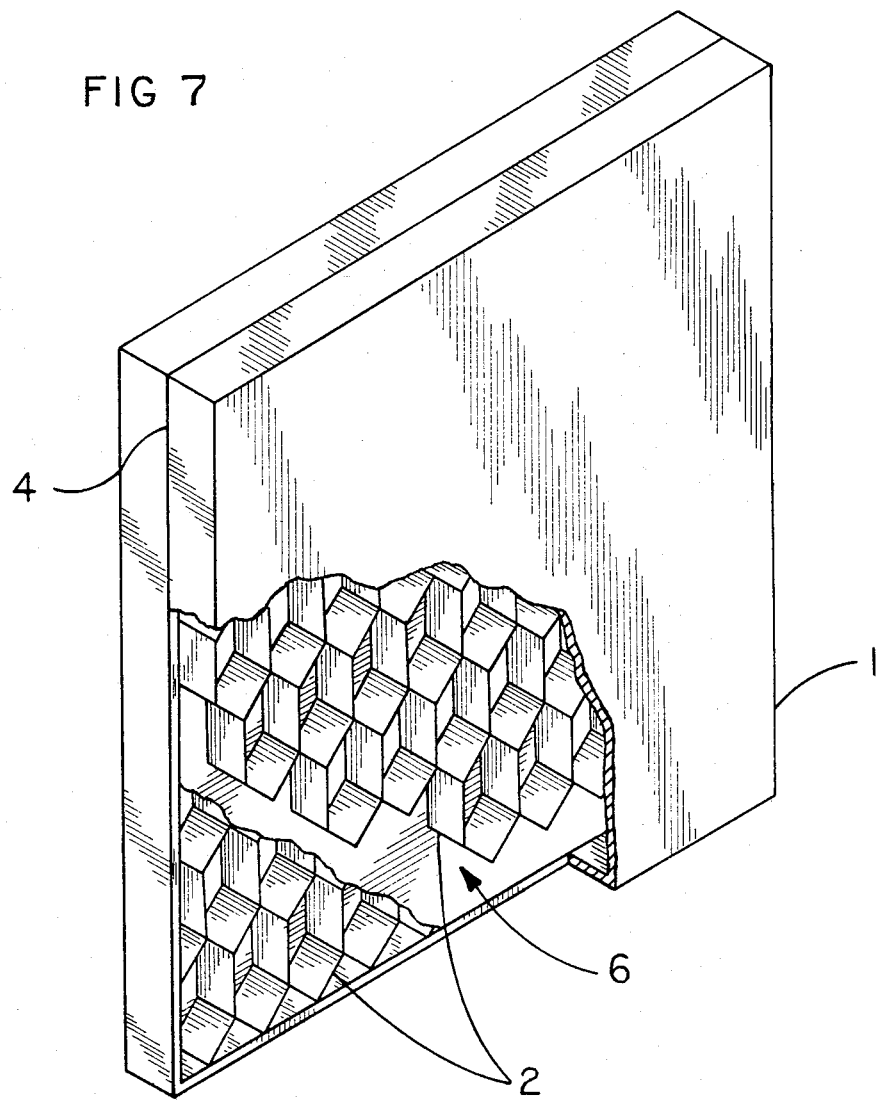
FIG. 7 is a cross sectional view that shows a variation of Vacuum Wall/Vacuum Window where a radiant barrier is sandwiched between two honeycomb support structures.

FIG. 7 shows a variation of the Vacuum Wall/Vacuum Window whereby the walls of the invention are supported by two honeycomb structures. Between the honeycomb structures, disposed within the chamber, is a means to block radiant heat flow. This radiant barrier can be made of any material that is low emittance and low absorbtion such as a plastic film with an aluminized coating or aluminum foil. A multiplicity of radiant barriers can be used to separate a multiplicity of interior supporting means. The use of a barrier disposed within the chamber of the invention significantly increases the R value of the invention.

Incorporation of the radiant barrier modifies the previous equation to:

$$\frac{1}{R} = \frac{1}{1/E_1 + 1/E_2 + n(2/E_3 - 1) - 1} \, a/tR_c$$

where:

$E_3$ is the emittance of the radiant barrier(s),
n is the number of radiant barrier(s).

Using this modified formula the R value for different configurations of the Vacuum Wall/Vacuum Window, with radiant barriers, are displayed in the following table:

| Surface Material | Number of Radiant Barriers | Thickness of Panel (in.) | R Value |
|---|---|---|---|
| Cadmium Plated Steel | 1 | 1 | 114 |
| | 2 | 1 | 141 |
| | 3 | 1 | 163 |
| | 11 | 3 | 466 |
| with a radiant barrier of aluminum foil where $E_3 = .03$ ||||
| Low E Glass | 1 | .5 | 21 |
| | 1 | 1 | 25.8 |
| with a radiant barrier of Heat Mirror where $E_3 = .12$ ||||

Thermal Diode

Referring now to the present invention whereby the mode of use is that of a thermal diode. This invention is constructed in the basic design as shown in FIGS. 1 and 2. By using a material with high absorbtance and low emittance on one of the surfaces 3 and a material with high emittance and low absorbtance on the second of the surfaces of the invention, heat can be transferred easily in one direction but poorly in the other direction. Such a thermal diode can be used as a selective thermal coupling between the interior of a building and the ambient atmosphere. A solar collector that utilizes the thermal diode as a selective thermal coupling between the solar collector means and the heat storage means, increases the efficiency of the collector by reducing the amount of heat that passes back through the collector plate during hours when the sun is not shining.

Thermal Valve

Referring now to the present invention whereby the mode of use is that of a thermal valve. This invention is constructed in the basic design as shown in FIGS. 1 and 2. By coating or treating one of the surfaces 3 so that it will change emittance and/or absorbtance at a specified temperature, heat can be transferred easily in one direction up to or down to a specified temperature. Such a coating is manufactured by Davis Liquid Crystal Inc., San Leandro, Calif., and others. Once the space to be controlled reaches the desired temperature, the coating changes its emittance and/or absorbtance characteristics. The present invention as a thermal valve can be used in any application requiring a controlled temperature.

Heat Storage Means

Referring now to the present invention whereby the mode of use is that of a heat storage means. The basic structure of the heat storage means is that which is shown in FIGS. 1 and 2. The difference is the interior chamber of the invention is filled with a heat storage material that has a high heat storage capacity, such as a eutectic salt hydrate or water. The supporting means maintains the shape of the chamber. The supporting means and the surfaces of the invention can be of sufficient strength and mechanically coupled to one another to permit the panel to function as a load bearing structure. Such a panel can be used in solar collectors to absorb and retain heat for extended periods of time. The interior honeycomb or cellular matrix 2 can be substituted with a network of trusses 5, depending on the substance that is used for heat storage. If, for example, the substance is a phase change material such as a eutectic salt hydrate, it would be desirable to encapsulate the material so as to help prevent stratification of the material. In this instance, a honeycomb structure or a cellular matrix is preferred. If, on the other hand, the heat storage substance is water, a truss structure is effective. Additionally, the truss can withstand internal pressure so the invention could be connected to a pressurized water supply system. Whatever structural system is used to support the interior of the chamber, be it a honeycomb, cellular matrix, or trusses, it can be made of a material that is thermally conductive to enhance the heat collecting capacity. Moreover, it will transfer the heat through the substances evenly. In this embodiment, fluid conduits can be disposed within the chamber. The fluid conduits are adapted to allow fluid to flow therethrough and provide heat transfer between the heat storage material and the fluid. The fluid carries the heat to points external to the chamber.

A Solar Radiant Energy Collector

Figure 4:
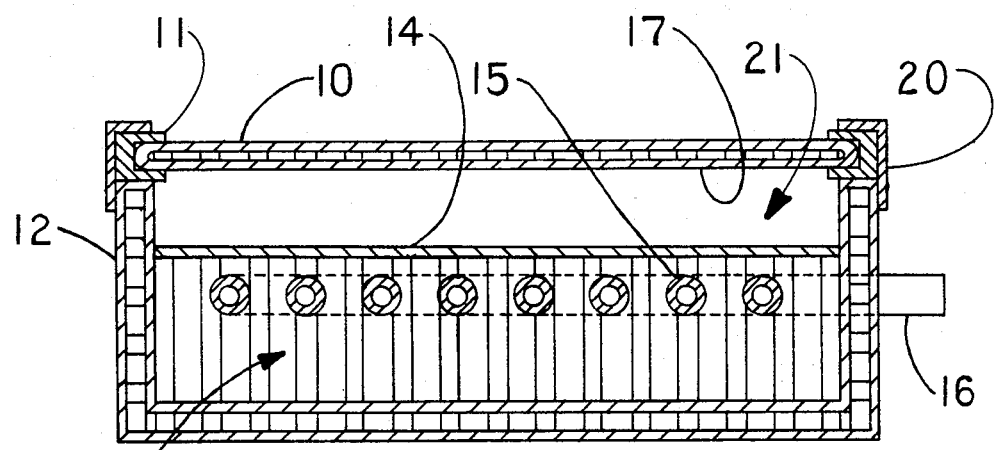
FIG. 4 is a cross sectional view whereby several modes of use have been combined to construct a solar radiant energy collector.
Figure 5:
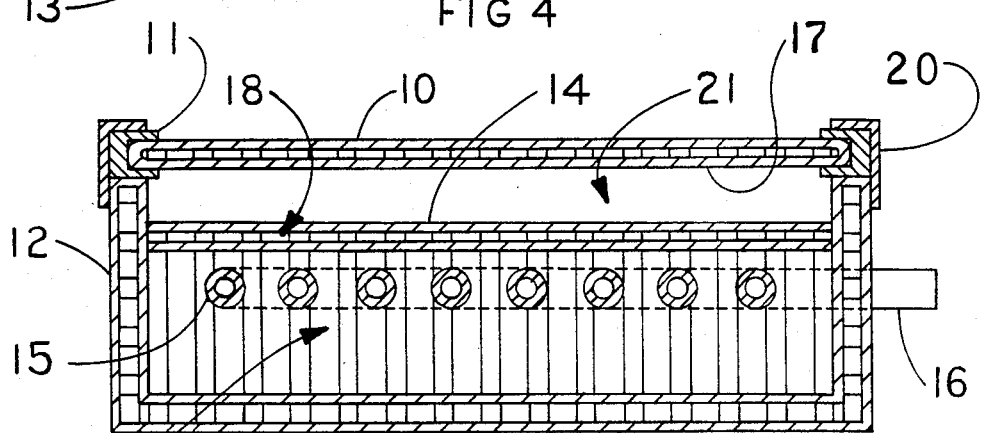
FIG. 5 is a cross sectional view that shows a slightly different design of the solar radiant energy collector where the collector plate is a thermal diode.
Figure 6:
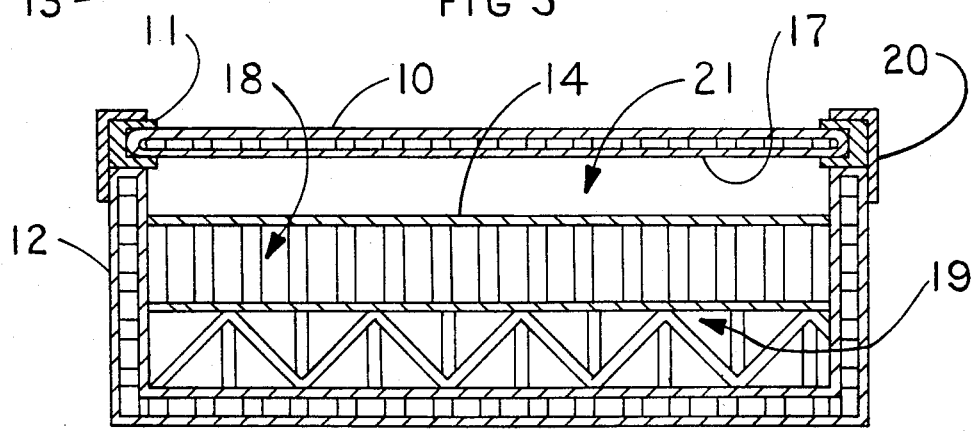
FIG. 6 is a cross sectional view that shows another variation of the solar radiant energy collector where water or another liquid is circulated through a truss system instead of through pipes.

A solar radiant energy collector can be made by combining the various modes of use of the invention as shown in FIGS. 4, 5, and 6. The basic design, is not shown; however, since it is similar to the version described in FIG. 4, it can be explained with reference to FIG. 4. The difference between the basic design and that shown in FIG. 4 is that the basic design does not utilize a heat storage means 13. The basic design consists of a cabinet 12 constructed from two boxes, as in FIG. 3 defining an upwardly open cavity with a floor. The cabinet is covered by a light transmitting cover 10, that is held in place by a standard rubber seal 11 and fastened to the box using a standard metal clip 20. The cavity of the cabinet 21 does not need to be evacuated because the cabinet and the cover provide sufficient insulation for the solar collector. Disposed within the cavity of the cabinet is a solar collector means 14. The solar collector means utilizes a selective surface or black surface for absorbing solar radiant energy admitted through the light transmitting cover and converting the solar radiant energy to thermal energy. Also disposed within the cavity of the cabinet is a heat removal means 15 for removing thermal energy from within the cavity of the cabinet. The surface of the cover that faces the cavity of the cabinet 17 can incorporate a transmittance control means. The transmittance control means varies the amount of solar radiant energy transmitted through the cover in accordance with variation of the temperature within the cavity to prevent the collector from overheating. Such a product is manufactured by Davis Liquid Crystals Inc., San Leandro, Calif., and others.

Another version of the solar radiant energy collector as shown in FIG. 4 includes a heat storage means 13 disposed within the cavity of the cabinet. The heat storage means absorbs and stores heat for subsequent usage. The solar radiant energy collector does not require pumps or controllers. It can be used to heat a domestic water supply or can be used to produce temperatures of over 250° Fahrenheit for industrial heating and cooling applications without the need for mechanical tracking systems or external storage containers. With this solar radiant energy collector, the need for a standard domestic water heater is eliminated. Additionally it can be used to warm the interior of a building.

FIG. 5 represents another version of the solar radiant energy collector whereby the cabinet, the light transmitting cover, the heat storage means and the heat removal means are constructed as described above for FIG. 4. The significant difference is that between the solar collector means and the heat storage means is 18 is a selective thermal coupling wherein one of the surfaces of the coupling has a means to reduce emittance and increase absorbtance and the second surface of the thermal coupling has a means to increase emittance and reduce absorbtance. During hours when the sun is not present, the selective thermal coupling inhibits the transference of heat from the heat storage means to the solar collector means, thus increasing the efficiency of the solar radiant energy collector during these hours.

FIG. 6 represents a solar radiant energy collector whereby the collector cabinet, the light transmitting cover, the solar collector means and the heat storage means are as described for FIG. 4 or FIG. 5. The difference is that the heat removal means is a panel 19 such as that shown in FIG. 2 using the truss structure for the internal support system. In this variation, water or another heat transferring fluid is conducted into the panel by means of a pipe introduced at one end of the panel and fluid is conducted out of the panel by means of a pipe at the opposite end of the panel The advantage of using this method to conduct fluid through the solar radiant energy collector is that the truss structure is of sufficient strength to allow large amounts of fluid to move through the cabinet at high pressure. Large amounts of fluids can be heated rapidly and the added mass of the water adds to the heat storage capacity. The solar collector can be made with a truss section filled with water only.

All variations of the solar radiant energy collectors represent a significant improvement in the passive solar collectors that are currently available. The use of the vacuum wall for the cabinet and the vacuum window for the light transmitting cover, provides a superior form of insulation that does not limit the size of the actual solar radiant energy collector. Moreover, the invention provides a workable means to maintain a vacuum using a variety of materials. Each unit of the invention that is used to construct the solar collector is stable in its own right.

While the above description contains many specifications, these should not be construed as limitations on the scope of the invention, but rather as an exemplification of several modes of use thereof. Many other variations are possible. Accordingly the scope of the invention should be determined not by the modes of use illustrated, but by the appended claims and their legal equivalent.

What is claimed is:

1. A solar radiant energy collector comprising:
A. an insulating cabinet defining an open cavity, comprising:
   a. two surfaces spaced apart from one another, each of said surfaces forming a box-like receptacle defining a cavity, one of said surfaces being within the cavity formed by the other of said surfaces, said surfaces each having peripheral edges and being hermetically sealed to one another along said peripheral edges to form a chamber therebetween;
   b. said chamber is evacuated; and
   c. a supporting means disposed within said chamber to prevent said surfaces from collapsing into said chamber;
B. a light transmitting cover for closing an open end of said cabinet and admitting solar radiant energy into said cavity thereof, said light transmitting cover comprising:
   a. two light transmitting surfaces parallel to each other and spaced apart from one another, said light transmitting surfaces each having peripheral edges and being hermetically sealed to one another along said peripheral edges of said light transmitting surfaces to form a chamber;
   b. said chamber of said light transmitting cover is evacuated; and
   c. a supporting means disposed within said chamber of said light transmitting cover, said supporting means preventing said light transmitting surfaces from collapsing into said evacuated chamber of said light transmitting cover;
C. a solar collector means enclosed within said cavity of said cabinet for absorbing solar radiant energy admitted through said light transmitting cover and converting said solar radiant energy to thermal energy; and
D. a heat removal means for removing thermal energy from within said cavity of said cabinet, said heat removal means being thermally coupled to said solar collector means.

2. A solar radiant energy collector as defined in claim 1 further including a heat storage means disposed within said cavity of said cabinet, said heat storage means functioning to absorb and store thermal energy for subsequent usage and comprising:
A. two surfaces parallel to each other and spaced apart from one another, said surfaces of said heat storage means each having peripheral edges and being sealed to one another along said peripheral edges of said surfaces of said heat storage means to form a chamber;
B. said chamber of said heat storage means is filled with a heat storage material; and
C. a supporting means disposed within said chamber of said heat storage means to maintain the shape of said chamber of said heat storage means.

3. A solar radiant energy collector comprising:
A. an insulating cabinet defining an open cavity, comprising:
   a. two surfaces parallel to each other and spaced apart from one another, each of said surfaces defining a cavity, one of said surfaces being within the cavity formed by the other of said surfaces, said surfaces each having peripheral edges and being hermetically sealed to one another along said peripheral edges to form a chamber therebetween;
   b. said chamber is evacuated; and
   c. a supporting means disposed within said chamber to prevent said surfaces from collapsing into said chamber;
B. a light transmitting cover for closing an open end of said cabinet and admitting solar radiant energy into said cavity thereof, said light transmitting cover comprising:
   a. two light transmitting surfaces parallel to each other and spaced apart from one another, said light transmitting surfaces each having peripheral edges and being hermetically sealed to one another along said peripheral edges of said light transmitting surfaces to form a chamber;
   b. said chamber of said light transmitting cover is evacuated; and
   c. a supporting means disposed within said chamber of said light transmitting cover, said supporting means preventing said light transmitting surfaces from collapsing into said evacuated chamber of said light transmitting cover;
C. a solar collector means enclosed within said cavity of said cabinet for absorbing solar radiant energy admitted through said light transmitting cover and converting said solar radiant energy to thermal energy;
D. a heat removal means for removing thermal energy from within said cavity of said cabinet, said heat removal means being thermally coupled to said solar collector means;
E. a heat storage means disposed within said cavity of said cabinet, said heat storage means functioning to absorb and store thermal energy for subsequent usage and comprising:
   a. two surfaces parallel to each other and spaced apart from one another, said surfaces of said heat storage means each having peripheral edges and being sealed to one another along said peripheral edges of said surfaces of said heat storage means to form a chamber;
   b. said chamber of said heat storage means is filled with a heat storage material; and
   c. a supporting means disposed within said chamber of said heat storage means to maintain the shape of said chamber of said heat storage means; and
F. a selective thermal coupling means disposed between said solar collector means and said heat storage means and comprising:
   a. two surfaces parallel to each other and spaced apart from one another, said surfaces of said thermal coupling means each having peripheral edges and being hermetically sealed to one another along said peripheral edges of said surfaces of said thermal coupling means to form a chamber;
   b. said chamber of said thermal coupling means is evacuated; and
   c. a supporting means disposed within said chamber of said thermal coupling means to prevent said surfaces of said thermal coupling means from collapsing into said chamber of said thermal coupling means; and
   d. one of said surfaces of said thermal coupling means has a means to reduce emittance and increase absorptance and the second of said surfaces of said thermal coupling means has a means to increase emittance and reduce absorptance for transferring heat from said solar collector means to said heat storage means while inhibiting the transference of heat from said heat storage means to said solar collector means.

4. An insulating means comprising:
A. two surfaces each impermeable to gases and substantially parallel to each other and spaced apart from one another, said surfaces each having peripheral edges and being hermetically sealed to one another along said peripheral edges to form a chamber, said surfaces each being made of the same material to prevent stresses to said hermetic seal between said peripheral edges which stresses would otherwise result from differences in the contraction and expansion rates of said surfaces, and wherein one of said surfaces has a means to reduce emittance and increase absorptance and the second of said suraces has a means to increase emittance and reduce absorptance for transferring heat through said insultaing means easily in one direction but poorly in the other direction;
B. said chamber is evacuated to impair the transferrence of heat therethrough by conduction or convection; and
C. a supporting means disposed within said chamber to prevent said surfaces from collapsing into said chamber.

* * * * *